(12) United States Patent
Roy et al.

(10) Patent No.: US 7,061,935 B1
(45) Date of Patent: Jun. 13, 2006

(54) METHOD AND APPARATUS FOR ARBITRATING BANDWIDTH IN A COMMUNICATIONS SWITCH

(75) Inventors: Subhash C. Roy, Lexington, MA (US); Michael M. Renault, Medway, MA (US); Frederick R. Carter, Lawrence, MA (US); David K. Toebes, Andover, MA (US); Rajen S. Ramchandani, Clinton, MA (US)

(73) Assignee: Transwitch Corporation, Shelton, CT (US)

( * ) Notice: Subject to any disclaimer, the term of this patent is extended or adjusted under 35 U.S.C. 154(b) by 752 days.

(21) Appl. No.: 09/717,147

(22) Filed: Nov. 21, 2000

(51) Int. Cl.
*H04J 3/16* (2006.01)
*H04J 3/22* (2006.01)

(52) U.S. Cl. .................. 370/468; 370/388; 370/395.1

(58) Field of Classification Search ................ 370/468, 370/469, 470, 471, 472, 473, 474, 461, 462, 370/216, 229, 236, 352, 353, 395.1, 395.52, 370/395.7, 235
See application file for complete search history.

(56) References Cited

U.S. PATENT DOCUMENTS

| | | | | |
|---|---|---|---|---|
| 5,412,651 A * | 5/1995 | Gorshe | ...................... | 370/412 |
| 5,689,506 A * | 11/1997 | Chiussi et al. | .............. | 370/388 |
| 5,748,629 A | 5/1998 | Caldara | ...................... | 370/389 |
| 5,844,918 A * | 12/1998 | Kato | ........................... | 371/35 |
| 5,870,538 A | 2/1999 | Manning | ............... | 395/183.18 |
| 5,905,729 A | 5/1999 | Gaddis | ........................ | 370/399 |
| 5,909,429 A | 6/1999 | Manning | .................... | 370/219 |
| 5,940,375 A * | 8/1999 | Soumiya et al. | ............ | 370/249 |
| 5,959,991 A * | 9/1999 | Hatono et al. | ............ | 370/235.1 |
| 6,115,373 A * | 9/2000 | Lea | ............................. | 370/355 |
| 6,148,349 A * | 11/2000 | Chow et al. | .................. | 710/33 |
| 6,157,613 A * | 12/2000 | Watanabe et al. | ........... | 370/229 |
| 6,205,155 B1 * | 3/2001 | Parrella et al. | ............. | 370/462 |
| 6,275,499 B1 * | 8/2001 | Wynn et al. | ................ | 370/438 |
| 6,292,486 B1 * | 9/2001 | Little | ...................... | 370/395.1 |
| 6,320,861 B1 * | 11/2001 | Adam et al. | ............. | 370/395.7 |
| 6,359,891 B1 * | 3/2002 | Bergantino et al. | ......... | 370/398 |

* cited by examiner

*Primary Examiner*—Brian Nguyen
(74) *Attorney, Agent, or Firm*—Gordon & Jacobson, P.C.

(57) ABSTRACT

A network switch includes at least one port processor and at least one switch element. The port processor has an SONET OC-x interface (for TDM traffic), a UTOPIA interface (for ATM and packet traffic), and an interface to the switch element. In one embodiment, the port processor has a total I/O bandwidth equivalent to an OC-48, and the switch element has 12×12 ports for a total bandwidth of 30 Gbps. A typical switch includes multiple port processors and switch elements. A data frame of 9 rows by 1700 slots is used to transport ATM, TDM, and Packet data from a port processor through one or more switch elements to the same or another port processor. Each frame is transmitted in 125 microseconds; each row in 13.89 microseconds. Each slot includes a 4-bit tag plus a 4-byte payload. The slot bandwidth is 2.592 Mbps which is large enough to carry an E-1 signal with overhead. The 4-bit tag is a cross connect pointer which is setup when a TDM connection is provisioned. The last twenty slots of the frame are reserved for link overhead. Thus, the frame is capable of carrying the equivalent of 1,680 E-1 TDM signals. For ATM and packet data, a PDU (protocol data unit) of 16 slots is defined for a 64-byte payload. The PDUs are self-routed through the switch with a 28-bit routing tag which allows routing through seven switch stages using 4-bits per stage. Bandwidth is arbitrated among ATM and Packet connections while maintaining TDM timing.

24 Claims, 10 Drawing Sheets

| FIG.2A |
| FIG.2B |

| SLOT | 35 | 34 | 33 | 32 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|---|---|---|---|
| 0 | PARITY | | | PDU | 0 | 0 | ROUTING TAG | | | | | | | | | | | | | | | | | | | | | | | | | | | | | |
| 1 | PARITY | | | VER | | | VALID BYTES | | | | VOQ ID | | | | | | | FRAG ID | | A | FFS | | | | | | | | SEQ # | | | | | | | |
| 2 | PARITY | | | FFS | | | | | | | | | | | | | | | | | DEST FLOW ID | | | | | | | | | | | | | | | |
| 3 | PARITY | | | PAYLOAD BYTE 0 | | | | | | | | | | | | | | | | | PAYLOAD BYTE 1 | | | | | | | | PAYLOAD BYTE 2 | | | | PAYLOAD BYTE 3 | | | |
| 4 | PARITY | | | PAYLOAD BYTE 4 | | | | | | | | | | | | | | | | | PAYLOAD BYTE 5 | | | | | | | | PAYLOAD BYTE 6 | | | | PAYLOAD BYTE 7 | | | |
| ... | | | | | | | | | | | | | | | | | | | | | | | | | | | | | | | | | | | | |
| 15 | PARITY | | | PAYLOAD BYTE 48 | | | | | | | | | | | | | | | | | PAYLOAD BYTE 49 | | | | | | | | PAYLOAD BYTE 50 | | | | PAYLOAD BYTE 51 | | | |

FIG.3a

METHOD AND APPARATUS FOR ARBITRATING BANDWIDTH IN A COMMUNICATIONS SWITCH

BACKGROUND OF THE INVENTION

1. Field of the Invention

The invention relates to telecommunications networks. More particularly, the invention relates to a method for arbitrating bandwidth in a telecommunications network switch.

2. State of the Art

One of the earliest techniques for employing broadband telecommunications networks was called time division multiplexing (TDM). The basic operation of TDM is simple to understand. A high frequency signal is divided into multiple time slots within which multiple lower frequency signals can be carried from one point to another. The actual implementation of TDM is quite complex, however, requiring sophisticated framing techniques and buffers in order to accurately multiplex and demultiplex signals. The North American standard for TDM (known as T1 or DS1) utilizes twenty-four interleaved channels together having a rate of 1.544 Mbits/sec. The European standard for TDM is known as E-1 and utilizes thirty interleaved channels having a rate of 2.048 Mbits/sec. A hierarchy of multiplexing is based on multiples of the T1 or E-1 signal, one of the most common being T3 or DS3. A T3 signal has 672 channels, the equivalent of twenty-eight T1 signals. TDM was originally designed for voice channels. Today, however, it is used for both voice and data.

An early approach to broadband data communication was called packet switching. One of the differences between packet switching and TDM is that packet switching includes methods for error correction and retransmission of packets which become lost or damaged in transit. Another difference is that, unlike the channels in TDM, packets are not necessarily fixed in length. Further, packets are directed to their destination based on addressing information contained within the packet. In contrast, TDM channels are directed to their destination based on their location in the fixed frame. Today, a widely used packet switching protocol is known as IP (Internet Protocol).

More recently, broadband technologies known as ATM and SONET have been developed. The ATM network is based on fixed length packets (cells) of 53-bytes each (48-bytes payload with 5-bytes overhead). One of the characteristics of the ATM network is that users contract for a quality of service (QOS) level. Thus, ATM cells are assigned different priorities based on QOS. For example, constant bit rate (CBR) service is the highest priority service and is substantially equivalent to a provisioned TDM connection. Variable bit rate (VBR) service is an intermediate priority service which permits the loss of cells during periods of congestion. Unspecified bit rate (UBR) service is the lowest priority and is used for data transmission which can tolerate high latency such as e-mail transmissions.

The SONET network is based on a frame of 810-bytes within which a 783-byte synchronous payload envelope (SPE) floats. The payload envelope floats because of timing differences throughout the network. The exact location of the payload is determined through a relatively complex system of stuffs/destuffs and to pointers. In North America, the basic SONET signal is referred to as STS-1 (or OC-1). The SONET network includes a hierarchy of SONET signals wherein up to 768 STS-1 signals are multiplexed together providing the capacity of 21,504 T1 signals (768 T3 signals). STS-1 signals have a frame rate of 51.84 Mbit/sec, with 8,000 frames per second, and 125 microseconds per frame. In Europe, the base (STM-1) rate is 155.520 Mbit/sec, equivalent to the North American STS-3 rate (3*51.84=155.520), and the payload portion is referred to as the virtual container (VC). To facilitate the transport of lower-rate digital signals, the SONET standard uses sub-STS payload mappings, referred to as Virtual Tributary (VT) structures. (The ITU calls these Tributary Units or TUs.) Four virtual tributary sizes are defined: VT-1.5, VT-2, VT-3 and VT-6. VT-1.5 has a data transmission rate of 1.728 Mbit/s and accommodates a T1 signal with overhead. VT-2 has a data transmission rate of 2.304 Mbit/s and accommodates an E1 signal with overhead. VT-3 has a data transmission rate of 3.456 Mbit/s and accommodates a T2 signal with overhead. VT-6 has a data transmission rate of 6.912 Mbit/s and accommodates a DS2 signal with overhead.

Each of the above described broadband technologies can be categorized as TDM, ATM, or Packet technologies, with SONET being a complex form of TDM. From the foregoing, it will be appreciated that TDM, ATM and Packet each have their own unique transmission requirements. Consequently, different kinds of switches are used to route these different kinds of signals. In particular, TDM requires careful time synchronization; ATM requires careful attention to the priority of cells and QOS; and packet (e.g. IP) requires the ability to deal with variable length packets. For these reasons, switching technologies for TDM, ATM, and variable length packet switching have evolved in different ways. Service providers and network designers have thus been forced to deal with these technologies separately, often providing overlapping networks with different sets of equipment which can only be used within a single network.

SUMMARY OF THE INVENTION

It is therefore an object of the invention to provide methods and apparatus whereby different kinds of broadband signals can be switched through a single switching fabric.

It is also an object of the invention to provide a network element which can switch TDM, ATM, and variable length packet traffic all through the same switch fabric.

It is another object of the invention to provide a network switch chipset which can be combined with identical chip sets to provide a scalable network switch fabric.

It is a further object of the invention to provide a network switch which allows flexible partitioning among TDM, ATM, and variable length packet traffic.

Another object of the invention is to provide a network switch with redundant switch planes so that the failure of switch elements or links does not immediately cause a connection failure.

A further object of the invention is to provide a network switch which handles multicast as well as unicast voice and data transmission.

An additional object of the invention to provide a network switch which supports Clos architectures as well as folded Clos architectures.

In accord with these objects which will be discussed in detail below, the network switch of the present invention includes at least one port processor (also referred to in the appendices as a "service processor") and at least one switch element. The port processor has a SONET OC-x (SONET/SDH STS-x/STM-y) interface (for TDM traffic), a UTOPIA and UTOPIA-frame based interface (for ATM and packet traffic), and an interface to the switch element. An exemplary port processor has a total I/O bandwidth equivalent to a SONET OC-48 signal. An exemplary switch element has 12×12 ports and supports a total bandwidth of 30 Gbps.

A typical switch according to the invention includes multiple port processors and multiple switch elements. For a 48×48 "folded" switch, 48 port processors are coupled (four each) to 12 (first and third stage) switch elements and each of these twelve switch elements is coupled to 8 (second stage) switch elements. A three stage non-blocking switch according to the invention provides a total bandwidth of 240 Gbps and a five stage non-blocking switch provides a total bandwidth of 1 Tbps. An exemplary three stage folded Clos architecture switch includes forty-eight port processors and twenty switch elements. Four port processors are coupled to each of twelve (first and third stage) switch elements. Each of the twelve (first and third stage) switch elements are coupled to eight (second stage) switch elements. According to the presently preferred embodiment, each port processor is provided with means for coupling to two ports of a switch element or one port of two switch elements thereby providing redundancy in the event of a link failure.

According to the invention, a data frame of 9 rows by 1700 slots is used to transport ATM, TDM, and Packet data from a port processor through one or more switch elements to the same or another port processor. Each frame is transmitted in 125 microseconds, each row in 13.89 microseconds. Each slot includes a four-bit tag plus a four-byte payload (i.e., thirty-six bits). The slot bandwidth (1/1700 of the total frame) is 2.592 Mbps which is large enough to carry an E-1 signal with overhead. The four-bit tag is a cross connect pointer which is set up when a TDM connection is provisioned. The last twenty slots of the frame are reserved for link overhead. Thus, the frame is capable of carrying the equivalent of 1,680 E-1 TDM signals even though an STM-16 frame has a capacity of only 1008 E-1 signals.

For ATM and packet data, a PDU (protocol data unit) of sixteen slots is defined for a sixty-four-byte payload (large enough to accommodate an ATM cell with switch overhead). A maximum of ninety-six PDUs per row is permitted. The sixteen four-bit tags of a PDU are not needed for PDU routing so they are used as parity bits to protect the ATM or variable length packet payload. Of the sixty-four-byte payload, twelve bytes (96 bits) are used by the switch for internal routing. This leaves fifty-two bytes for actual payload which is sufficient to carry an ATM cell (without the one-byte HEC) and sufficient for larger packets after fragmentation. The PDUs are self-routed through the switch with a twenty-eight-bit routing tag which allows routing through seven switch stages using four-bits per stage. The remaining sixty-eight bits of the PDU are used for various other addressing information such as indicating whether the PDU contains an ATM cell, a packet, or a control message, whether reassembly of the packet should be aborted, whether the payload is a first fragment, middle fragment or last fragment, how many payload bytes are in the last fragment, the fragment sequence count, and a destination flow identifier.

The link overhead (LOH) in the last twenty slots of the frame is analogous in function to the line and section overhead in a SONET frame. The LOH may contain a 36-bit frame alignment pattern which is used to delineate the byte and row boundaries from serial data streams, a 32-bit status register for each output link, a 32-bit switch and link identifier, and a 32-bit stuff pattern.

Since ATM and Packet traffic are typically not provisioned, bandwidth must be arbitrated among ATM and Packet connections as traffic enters the system. Moreover, since TDM traffic shares the same frame as ATM and Packet traffic, bandwidth must be arbitrated while maintaining TDM timing. According to the invention, bandwidth is arbitrated by a system of requests and grants which is implemented for each PDU in each row of the frame. The switch elements provide three channels per link, two of which are used to carry data and arbitration requests and one of which is used to carry arbitration grants. According to the presently preferred embodiment, a forty-eight-bit (1.5 slot) request element is generated for each PDU in the next row of the frame. Each switch element includes a single request parser and a separate request arbitration module for each output link. The request elements are generated by the port processors and include intra-switch "hop-by-hop" routing tags and priority level information. Request elements are buffered by the switch elements and low priority request elements are discarded by a switch element if the buffer fills. Each request element which is not discarded as it travels through the switch fabric is returned to the port processor from which it originated during one "row time", i.e. 13.89 microseconds. As suggested above, requests are made "in band" interleaved with data and grants (the returned request elements) are made "out of band" using the third channel in each link.

In order to maintain timing for TDM traffic, the V1–V4 bytes in the VT/VC frame are stripped off and the VC bytes are buffered at ingress to the switch by a port processor. The V1–V4 bytes are regenerated at the egress from the switch by a port processor. In rows having both PDU and TDM traffic, the PDUs are configured early and the TDM slots are configured late in the row.

According to the presently preferred embodiment, each switch element includes a multicast controller and a separate multicast PDU buffer. Multicast request elements flow through the switch in the same manner as standard unicast request elements. At the point where the message needs to be multicast, the hop-by-hop field's bit code for that switch stage indicates that the request is multicast. The request is forwarded to the multicast controller. On the grant path, the multicast controller sources a grant if there is room for the data in the multicast recirculating buffers. Once the data has been transmitted to the multicast buffer, the multicast controller examines the data header and determines on which output links it needs to be sent out. At this point, the multicast controller sources a number of request messages which are handled in the same manner as unicast requests.

Additional objects and advantages of the invention will become apparent to those skilled in the art upon reference to the detailed description taken in conjunction with the provided figures.

BRIEF DESCRIPTION OF THE DRAWINGS

FIG. 3a is a schematic diagram illustrating the presently preferred format of a PDU according to the invention;

BRIEF DESCRIPTION OF THE APPENDIX

Appendix A is an engineering specification (Revision 0.3) for a port processor according to the invention; and Appendix B is an engineering specification (Revision 0.3) for a switch element according to the invention.

DETAILED DESCRIPTION OF THE PREFERRED EMBODIMENTS

Figure 1A:
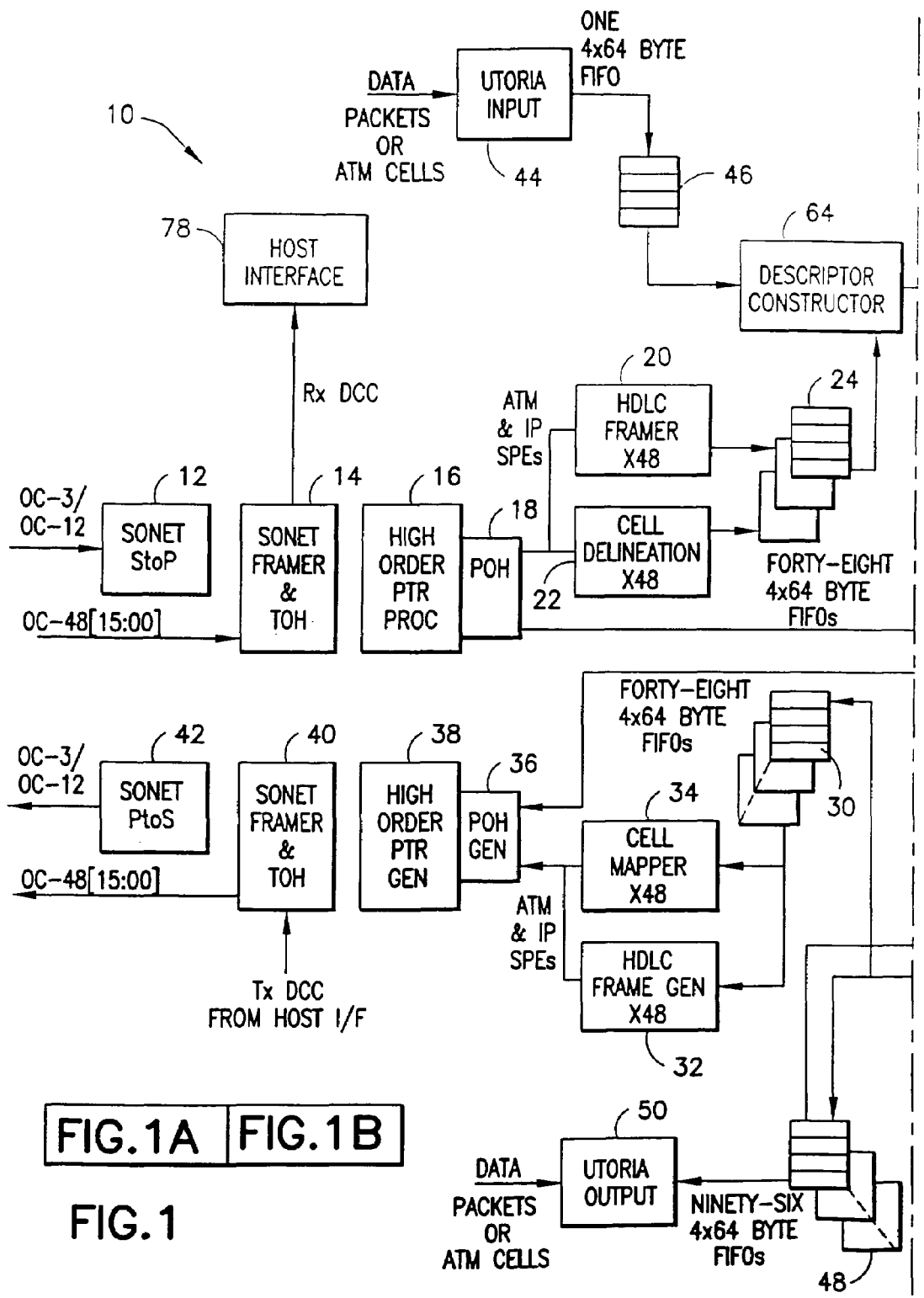
FIG. 1 is a simplified schematic diagram of a port processor according to the invention.
Figure 1B:
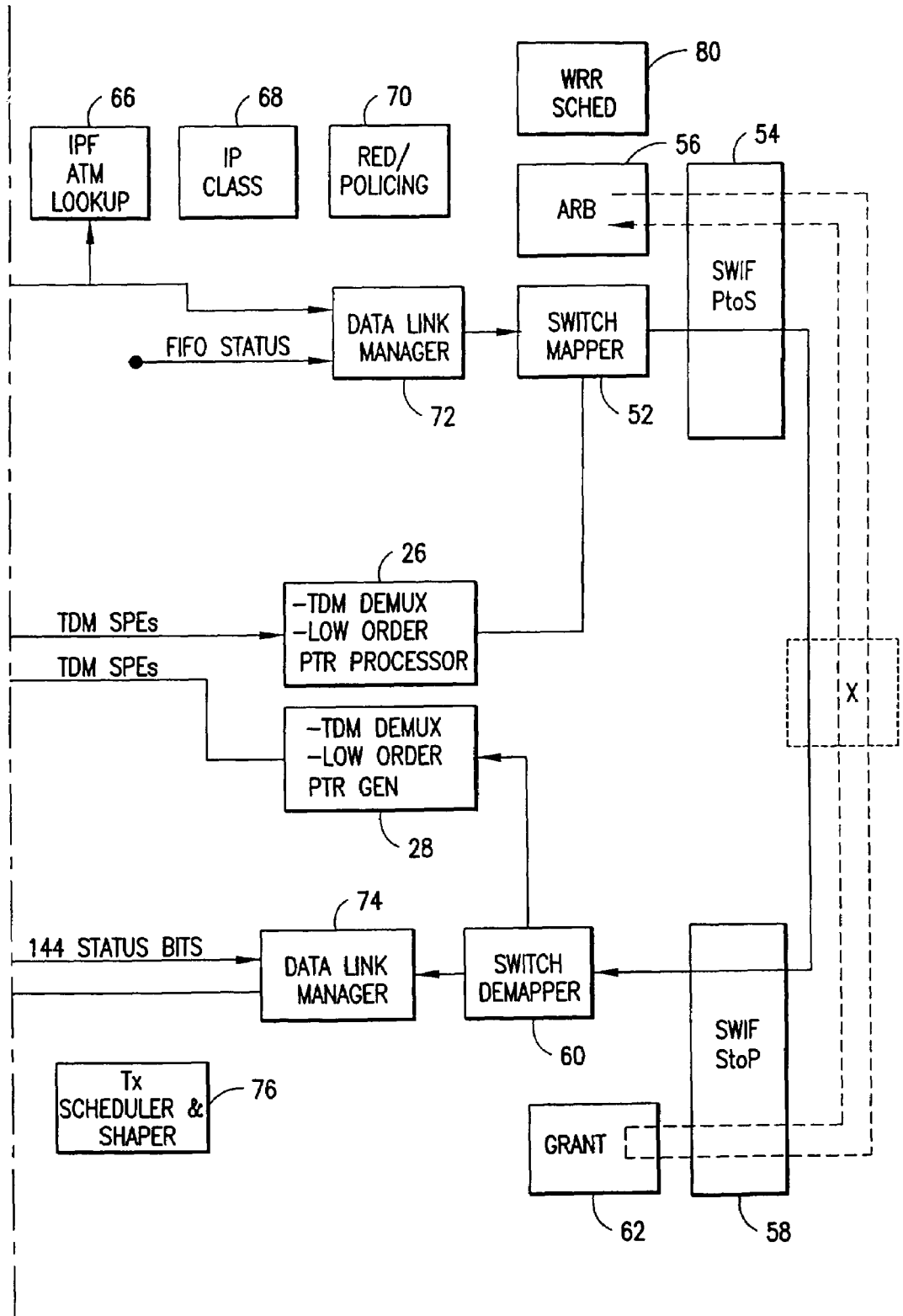
Figures 2, 2A:
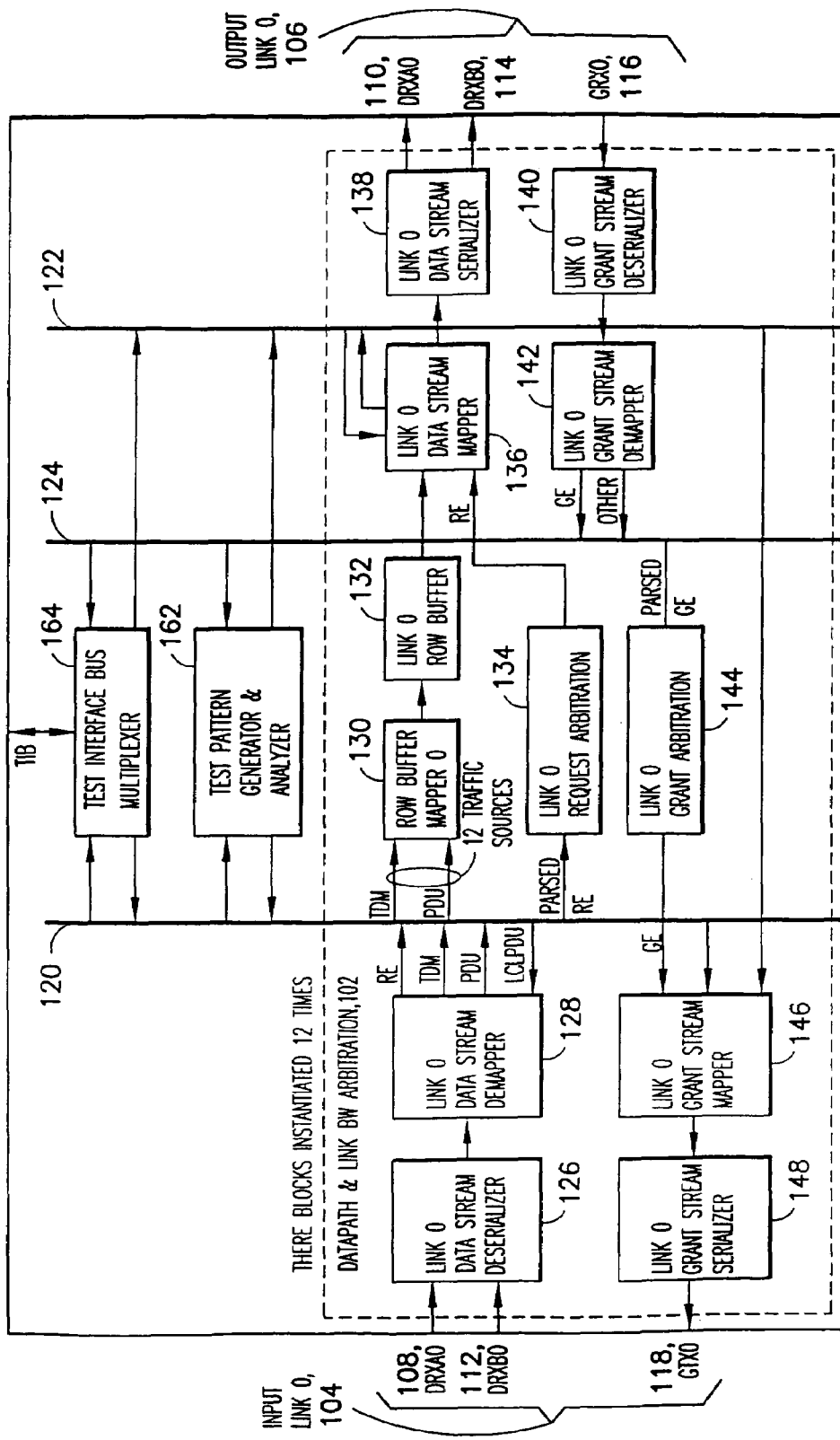
FIG. 2 is a simplified schematic diagram of a switch element according to the invention.
Figure 2B:
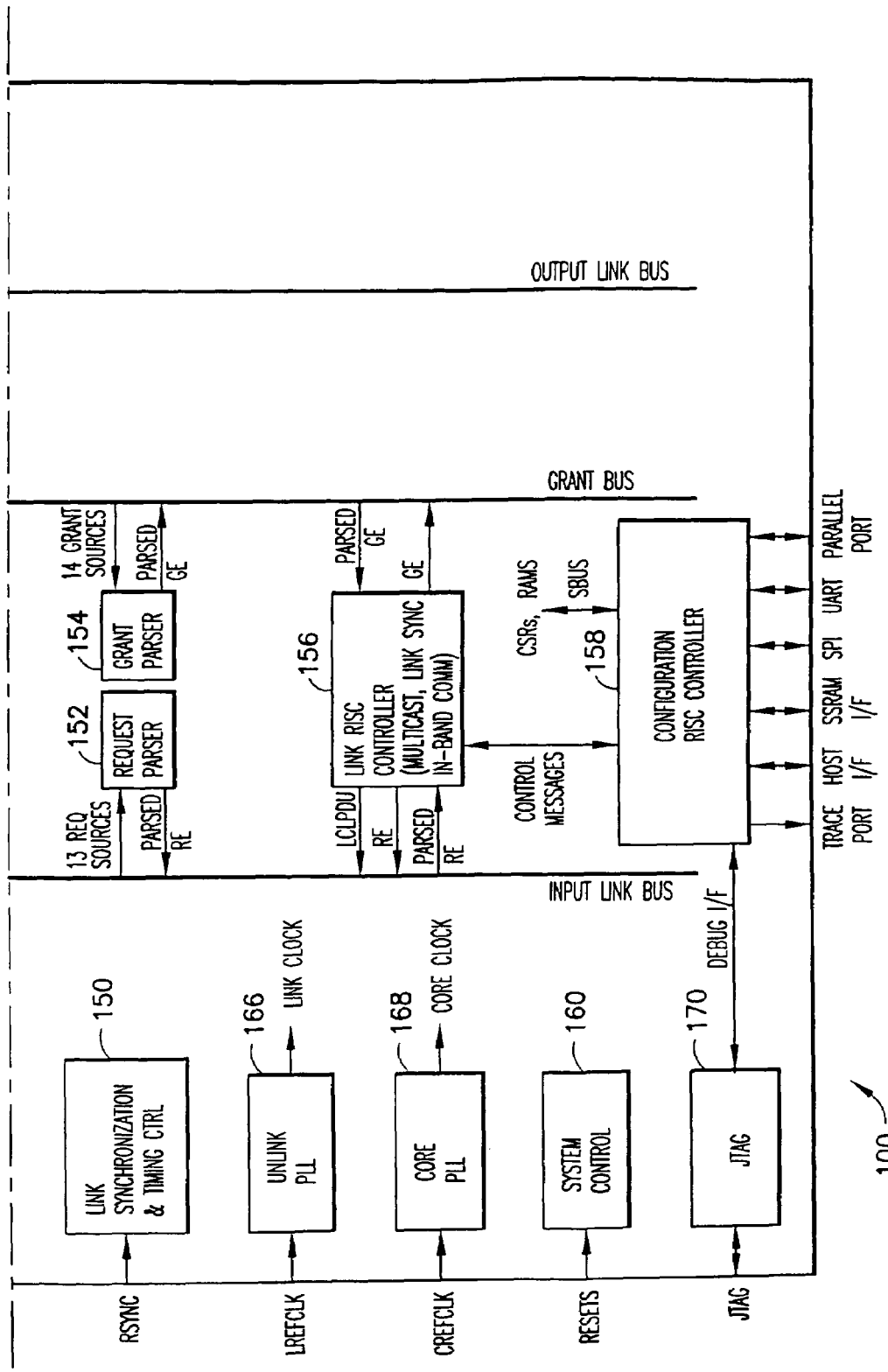

The apparatus of the invention generally includes a port processor and a switch element. FIG. 1 illustrates the main features of the port processor 10, and FIG. 2 illustrates the main features of the switch element 100. Referring now to FIG. 1, the port processor 10 includes a SONET interface and a UTOPIA interface. On the ingress (RX) side, the SONET interface includes a serial to parallel converter 12, a SONET framer and transport overhead (TOH) extractor 14, a high order pointer processor 16, and a path overhead (POH) extractor 18. For ATM and IP packets transported in an SPE, the ingress side of the SONET interface includes forty-eight HDLC framers 20 (for IP), forty-eight cell delineators 22 (for ATM), and forty-eight 64-byte FIFOs 24 (for both ATM and IP. For TDM signals transported in an SPE, the ingress side of the SONET interface includes a demultiplexer and low order pointer processor 26. On the egress (TX) side, the SONET interface includes, for TDM signals, a multiplexer and low order pointer generator 28. For ATM and IP packets transported in an SPE, the egress side of the SONET interface includes forty-eight 64-byte FIFOs 30, forty-eight HDLC frame generators 32, and forty-eight cell mappers 34. The egress side of the SONET interface also includes a POH generator 36, a high order pointer generator 38, a SONET framer and TOH generator 40, and a parallel to serial interface 42. On the ingress side, the UTOPIA interface includes a UTOPIA input 44 for ATM and Packets and one 4×64-byte FIFO 46. On the egress side, the UTOPIA interface includes ninety-six 4×64-byte FIFOs 48 and a UTOPIA output 50.

The ingress portion of the port processor 10 also includes a switch mapper 52, a parallel to serial switch fabric interface 54, and a request arbitrator 56. The egress portion of the port processor also includes a serial to parallel switch fabric interface 58, a switch demapper 60, and a grant generator 62.

For processing ATM and packet traffic, the port processor 10 utilizes, at the ingress portion, a descriptor constructor 64, an IPF and ATM lookup processor 66, an IP classification processor 68, an RED/Policing processor 70, all of which may be located off-chip. These units process ATM cells and packets before handing them to a (receive) data link manager 72. At the egress portion of the port processor, a (transmit) data link manager 74 and a transmit scheduler and shaper 76 are provided. Both of these units may be located off-chip. The port processor is also provided with a host interface 78 and a weighted round robin scheduler 80.

Figure 3:
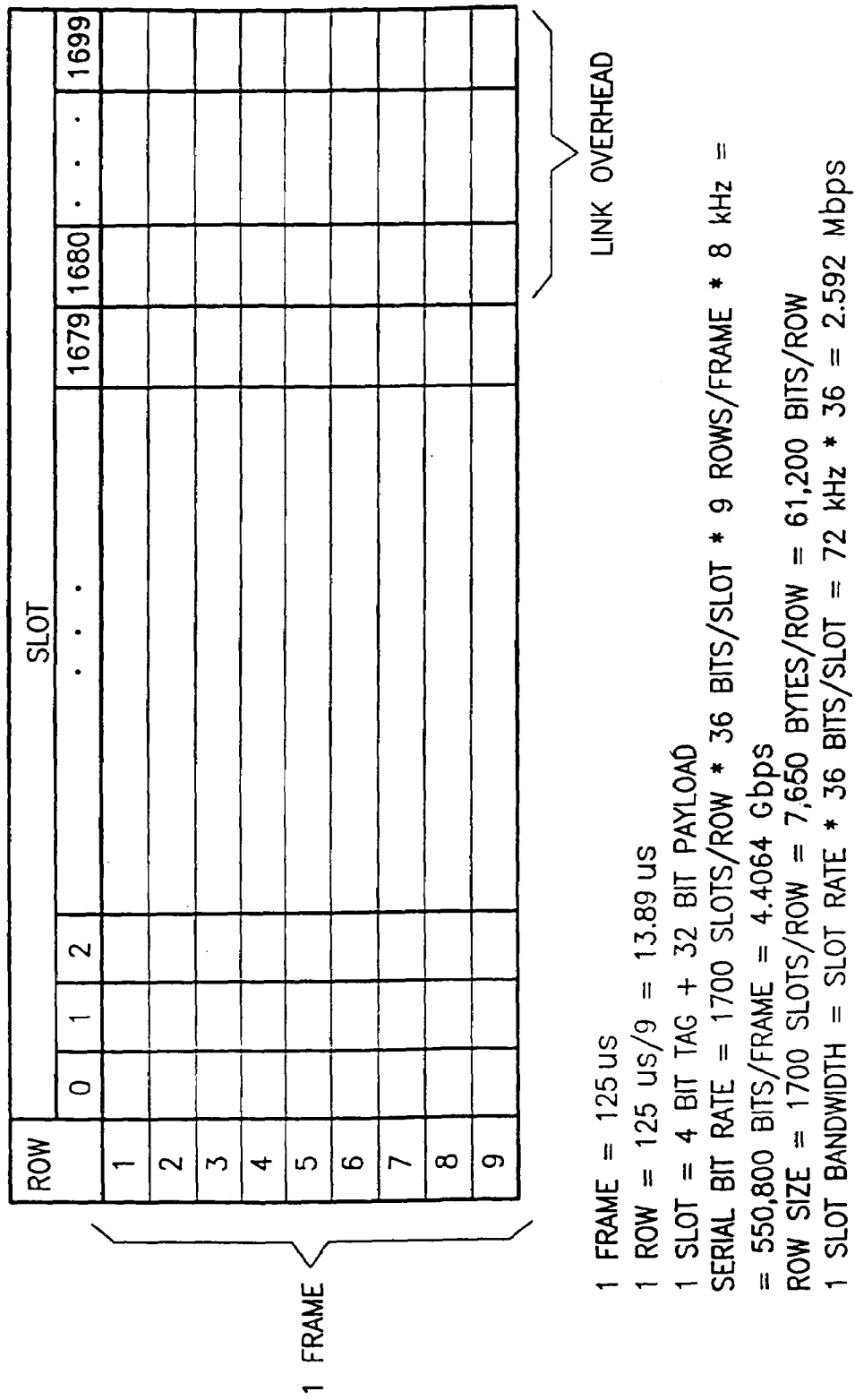
FIG. 3 is a schematic diagram illustrating the data frame structure of the invention.

The purpose of the port processor at ingress to the switch is to unpack TDM, Packet, and ATM data and frame it according to the data frame described below with respect to FIG. 3. The port processor also buffers TDM and packet data while making arbitration requests for link bandwidth through the switch element and grants arbitration requests received through the switch as described in more detail below. In order to maintain timing for TDM traffic, the V1–V4 bytes in the SONET frame are stripped off and the VC bytes are buffered at the ingress to the switch. In rows having both PDU and TDM traffic, it is preferable that the PDUs are configured early and the TDM slots are configured late in the row. At the egress of the switch, the port processor reassembles TDM, Packet, and ATM data. The V1–V4 bytes are regenerated at the egress from the switch.

Though not shown in FIG. 1, the port processor 10 includes dual switch element interfaces which permit it to be coupled to two switch elements or to two ports of one switch element. When both interfaces are used, the "standby" link carries only frame information until a failure in the main link occurs and then data is sent via the standby link. This provides for redundancy in the switch so that connections are maintained even if a portion of the switch fails.

Turning now to FIG. 2, a switch element 100 according to the invention includes twelve "datapath and link bandwidth arbitration modules" 102 (shown only once in FIG. 2 for clarity). Each module 102 provides one link input 104 and one link output 106 through the switch element 100. Those skilled in the art will appreciate that data entering any link input can, depending on routing information, exit through any link output. According to the invention, each module 102 provides two forward datapaths 108, 110, 112, 114 and one return "grant" path 116, 118. The three paths are collectively referred to as constituting a single channel. The reason why two datapaths are provided is to increase the bandwidth of each channel. The two datapaths are interleaved to provide a single "logical" serial datastream which exceeds (doubles) the bandwidth of a single physical datastream. Data is routed from an input link 104 to an output link 106 via an input link bus 120 and an output link bus 122. Return path grants are routed from an output link 106 to an input link 104 via a grant bus 124.

The forward datapaths of each "datapath and link bandwidth arbitration module" 102 include a data stream deserializer 126, a data stream demapper 128, a row buffer mapper 130, a row buffer 132, a request arbitration module 134, a data stream mapper 136, and a data stream serializer 138. The return grant path for each module 102 includes a grant stream deserializer 140, a grant stream demapper 142, a grant arbitration module 144, a grant stream mapper 146, and a grant stream serializer 148.

The switch element 100 also includes the following modules which are instantiated only once and which support the functions of the twelve "datapath and link bandwidth arbitration modules" 102: a link synchronization and timing control 150, a request parser 152, a grant parser 154, and a link RISC processor 156. The switch element 100 also includes the following modules which are instantiated only once and which support the other modules, but which are not directly involved in "switching": a configuration RISC processor 158, a system control module 160, a test pattern generator and analyzer 162, a test interface bus multiplexer 164, a unilink PLL 166, a core PLL 168, and a JTAG interface 170.

Figure 4:
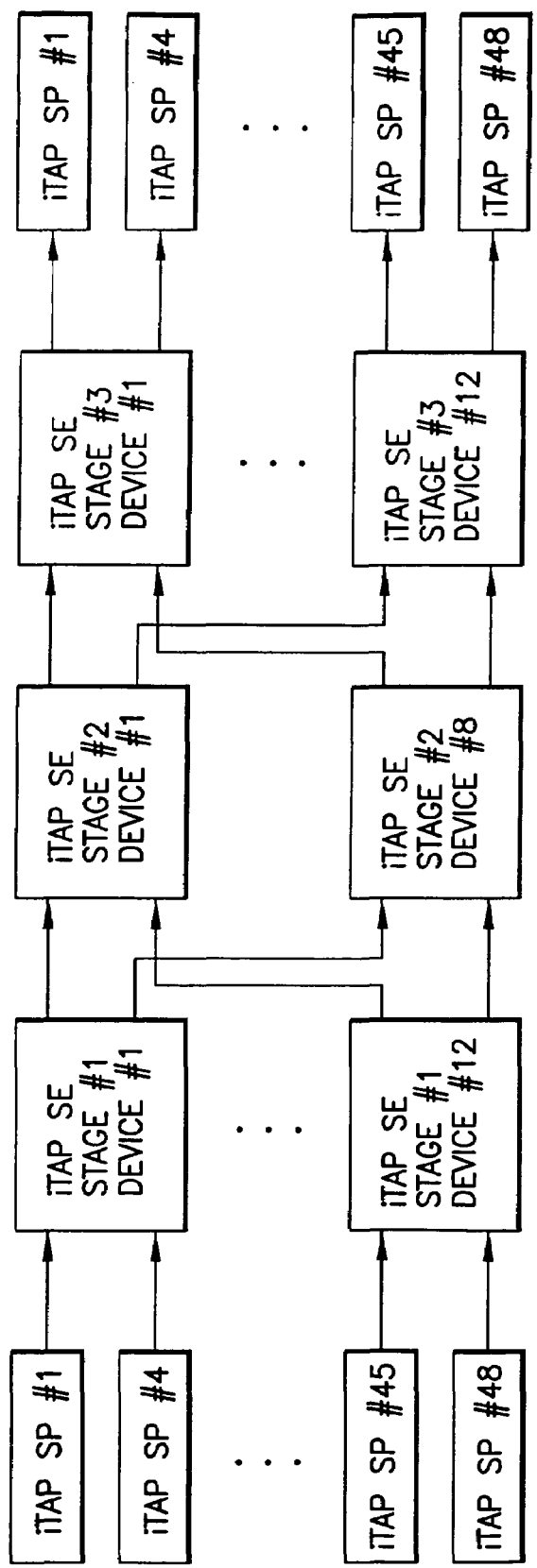
FIG. 4 is a schematic illustration of a three stage 48×48 switch according to the invention.
Figure 5:
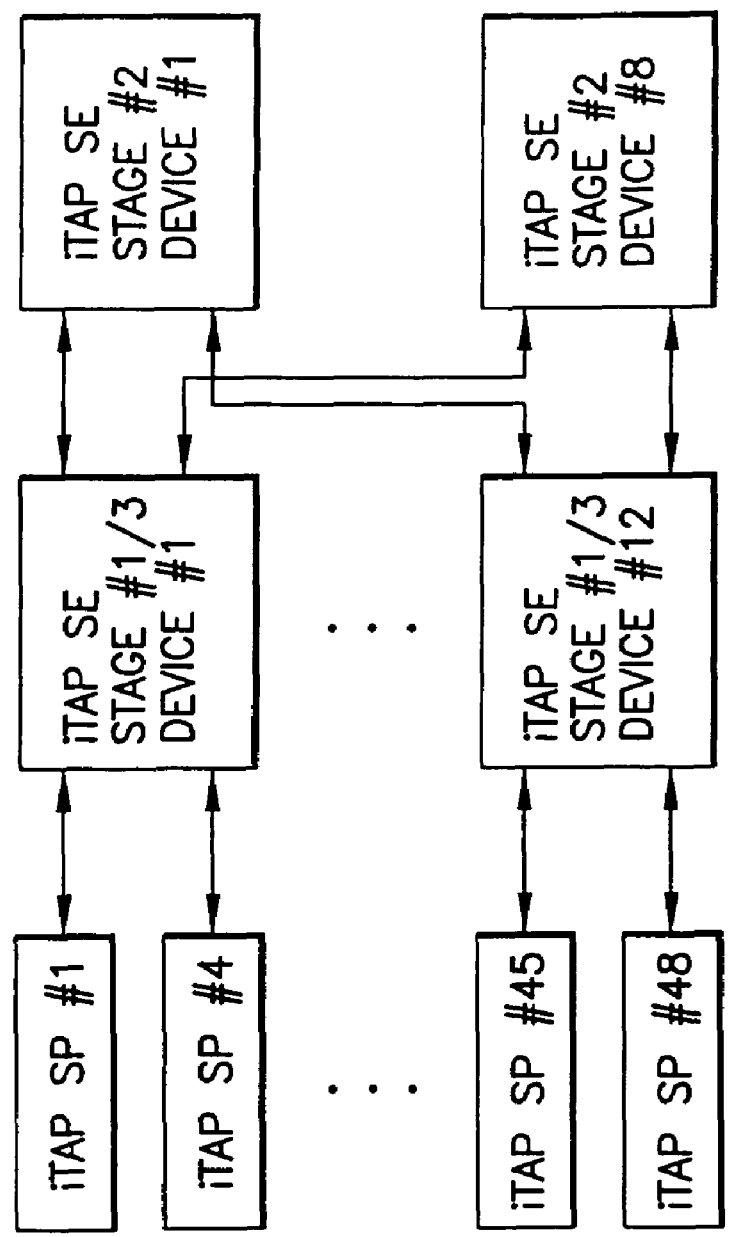
FIG. 5 is a schematic illustration of a 48×48 folded Clos architecture switch according to the invention.

A typical switch according to the invention includes multiple port processors 10 and multiple switch elements 100. For example, as shown in FIG. 4, forty-eight "input" port processors are coupled to twelve "first stage" switch elements, four to each. Each of the first stage switch elements is coupled to eight second stage switch elements. Each of the second stage switch elements is coupled to twelve third stage switch elements. Four "output" port processors are coupled to each of the third stage switch elements. From the foregoing, those skilled in the art will appreciate that the port processors and the switch elements of invention can be arranged in a folded Clos architecture as shown in FIG. 5 where a single switch element acts as both first stage and third stage.

Before describing in detail the functions of the port processor 10 and the switch element 100, it should be appreciated that the invention utilizes a unique framing technique which is well adapted to carry combinations of TDM, ATM, and Packet data in the same frame. Turning now to FIG. 3, according to the invention, a data frame of nine rows by 1700 slots is used to transport ATM, TDM, and Packet data from a port processor through one or more switch elements to a port processor. Each frame is transmitted in 125 microseconds, each row in 13.89 microseconds. Each slot includes a four-bit tag plus a four-byte payload (i.e., thirty-six bits). The slot bandwidth (1/1700 of the total frame) is 2.592 Mbps which is large enough to carry an E-1 signal with overhead. The four-bit tag is a cross connect pointer which is set up when a TDM connection is provisioned. The last twenty slots of the frame are reserved for link overhead (LOH). Thus, the frame is capable of carrying the equivalent of 1,680 E-1 TDM signals. The link overhead (LOH) in the last twenty slots of the frame is analogous in function to the line and section overhead in a SONET frame.

The contents of the LOH slots are inserted by the switch mapper (52 in FIG. 1). There are four types of data which may be inserted in the LOH slots. A 36-bit framing pattern is inserted into one of the twenty slots. The framing pattern is common to all output links and configurable via a software programmable register. A 32-bit status field is inserted into another slot. The status field is unique for each output link and is configurable via a software programmable register. A 32-bit switch and link identifier is inserted into another slot. The switch and link identifier includes a four bit link number, a twenty-four bit switch element ID, and a four bit stage number. A 32-bit stuff pattern is inserted into slots not used by framing, status, or ID. The stuff pattern is common to all output links and is configurable via a software programmable register.

For ATM and packet data, a PDU (protocol data unit) of sixteen slots is defined for a sixty-four-byte payload (large enough to accommodate an ATM cell with overhead). The format of the PDU is illustrated in FIG. 3a. A maximum of ninety-six PDUs per row is permitted (it being noted that the maximum number of ATM cells in a SONET OC-48 row is seventy-five). The sixteen four-bit tags (bit positions 32–35 in each slot) are not needed for PDU routing so they are used as parity bits to protect the ATM or IP payload. Of the sixty-four-byte payload, twelve bytes (96 bits) are used by the switch for internal routing (slots 0–2, bit positions 0–31). This leaves fifty-two bytes (slots 3–15) for actual payload which is sufficient to carry an ATM cell (without the one-byte HEC) and sufficient for larger packets after fragmentation. The PDUs are self-routed through the switch with a twenty-eight-bit routing tag (slot 0, bit positions 0–27) which allows routing through seven stages using four bits per stage. The remaining sixty-eight bits of the PDU are used for various other addressing information.

As shown in FIG. 3a, the PDU bits at slot 0, bits 30–31 are used to identify whether the PDU is idle (00), an ATM cell (01), an IP packet (10), or a control message (11). The two bits at slot 1, bit positions 30–31 are used to indicate the internal protocol version of the chip which produced the PDU. For Packets and control messages, the "valid bytes" field (slot 1, bits 24–29) are used to indicate how many payload bytes are carried by the PDU when the FragID field indicates that the PDU is the last fragment of a fragmented packet. The VOQID field (slot 1, bit positions 19–23) identifies the class of service for the PDU. The class of service can be a value from 0 to 31, where 0 is the highest priority and 31 is the lowest. The FragID at slot 1, bits 17–18 indicates whether this PDU is a complete packet (11), a first fragment (01), a middle fragment (00), or a last fragment (10). The A bit at slot 1, bit position 16 is set if reassembly for this packet is being aborted, e.g. because of early packet (or partial packet) discard operations. When this bit is set, fragments of the packet received until this point are discarded by the output port processor. The fields labelled FFS are reserved for future use. The Seq# field at slot 1, bits 0–3 is a modular counter which counts packet fragments. The DestFlowId field at slot 2, bits 0–16 identifies the "flow" in the destination port processor to which this PDU belongs. A "flow" is an active data connection. There are 128K flows per port processor.

As mentioned above, since ATM and Packet traffic are typically not provisioned, bandwidth must be arbitrated among ATM and Packet connections as traffic enters the system. Moreover, since TDM traffic shares the same frame as ATM and Packet traffic, bandwidth must be arbitrated while maintaining TDM timing. According to the invention, bandwidth is arbitrated by a system of requests and grants which is implemented for each PDU in each row of the frame. The request elements, which are generated by the port processors include "hop-by-hop" internal switch routing tags, switch element stage, and priority information. According to the presently preferred embodiment two request elements are sent in a three contiguous slot bundle and at least eight slots of non-request element traffic must be present between request element bundles. The time separation between request element bundles is used by the arbitration logic in the switch elements and the port processors to process the request elements. The presently preferred request element format is shown in section 7.1.5 of Appendix B.

Figure 3B:
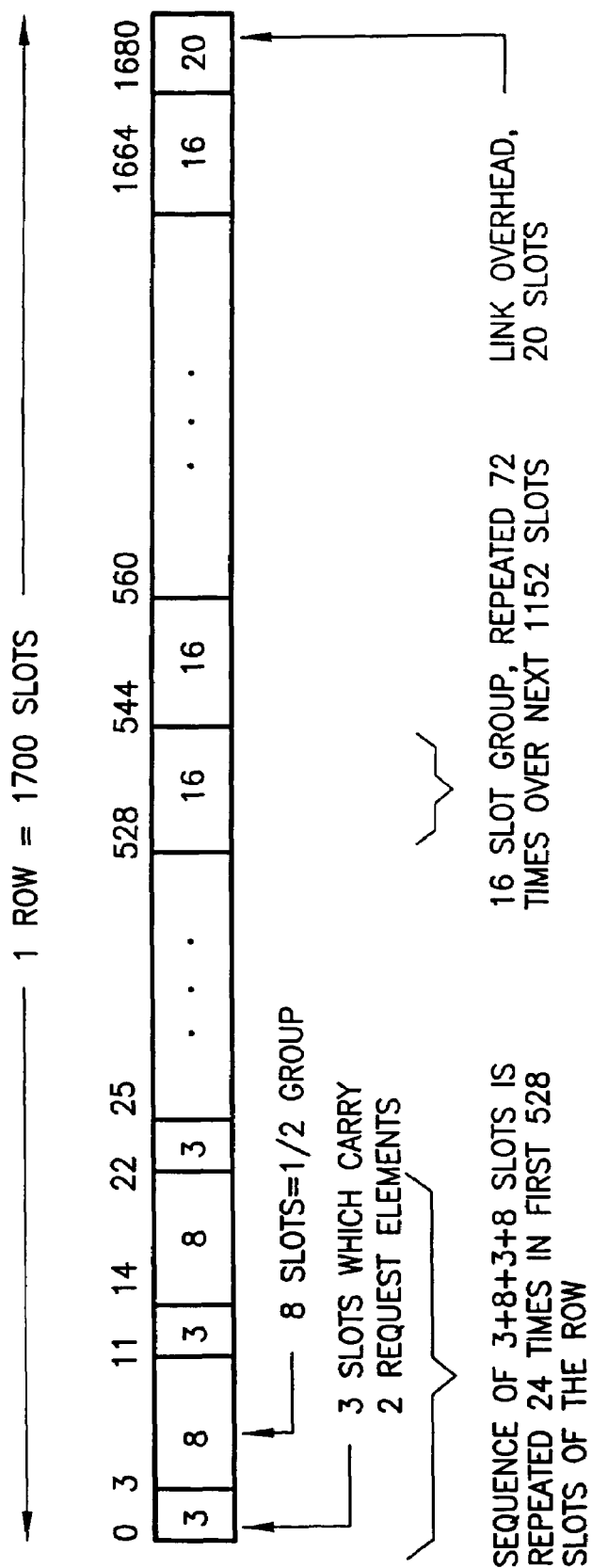
FIG. 3b is a schematic diagram illustrating the row structure including request elements to a first stage of the switch.

FIG. 3b illustrates one example of how the row slots may be allocated for carrying PDUs and request elements. As shown, the maximum PDU capacity for a row is ninety-six. A block of sixteen slots which is capable of carrying a single PDU is referred to as a "group". For each group in the row, 1.5 slots of bandwidth are required for carrying a forty-eight-bit request element (RE). FIG. 3b illustrates how two REs are inserted into three slots within each of the first twenty-four groups. All the REs should be carried within the row as early as possible in order to allow the REs to ripple through the multistage switch fabric as soon as possible after the start of a row. Section 7 of Appendix B explains in detail how this affects the arbitration process.

Figure 3C:
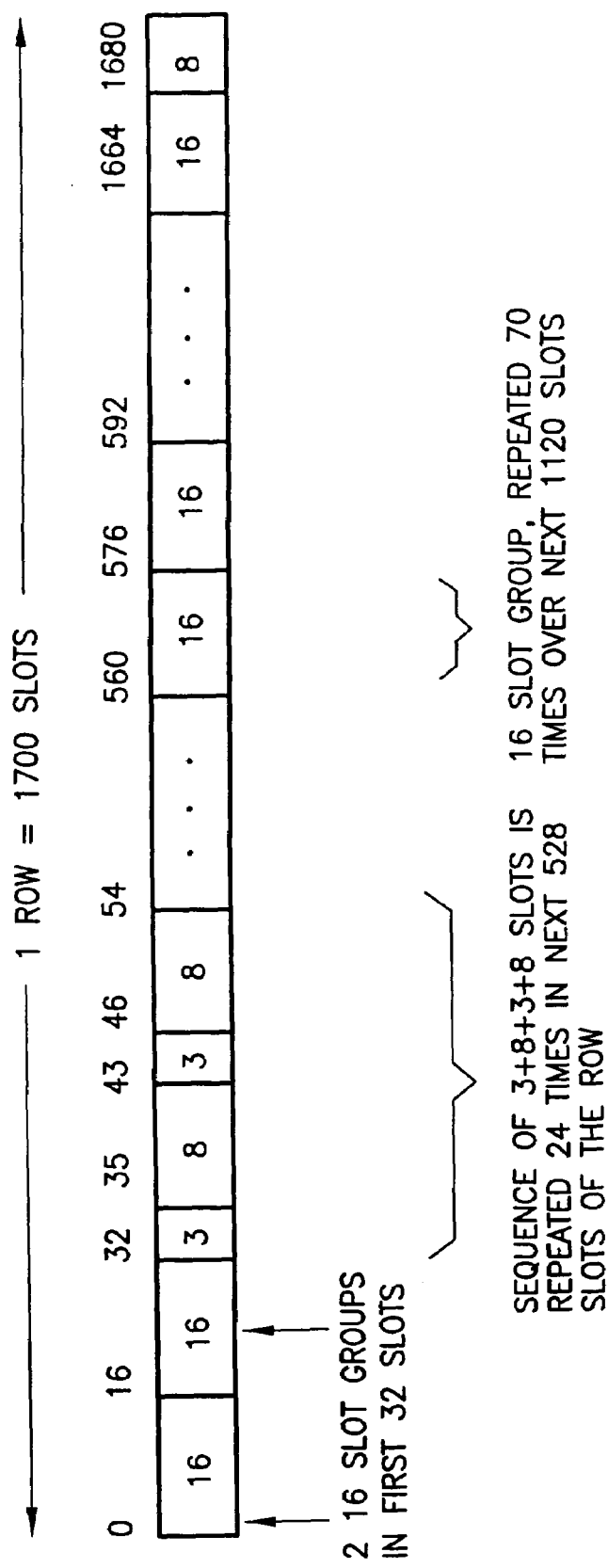
FIG. 3c is a schematic diagram illustrating the row structure including request elements to a second stage of the switch.

The structure shown in FIG. 3b is presently considered to be the optimal format (for the first link) given system requirements and implementation constraints. It places the REs early in the row but spaces them out enough to allow for arbitration. According to the presently preferred embodiment, the row structure is somewhat different depending on for which link of the switch it is configured. FIG. 3b represents the row structure between the port processor and a switch element of the first switch fabric stage. The first block of two REs occupy the first three slots of the row. The present implementation of the arbitration logic which processes REs requires at least twelve slot times of latency between each three-slot block of REs on the input link. Also, there must be some latency from when the first REs of the row are received by a switch element to when the REs are inserted into the output link of the switch element. This latency is used by the arbitration logic for mapping incoming REs into the RE buffers. Thus, the row structure for the link between the first stage and the second stage should have the first group of REs starting at slot time 32. This is illustrated in FIG. 3c which shows the same structure as FIG. 3b offset by thirty-two slot times.

According to the presently preferred embodiment, TDM traffic may be switched through the switch elements with a finest granularity of one slot per row. The TDM traffic is switched through the same path for a given slot for every row. The switch elements will not allow different switch paths for the same TDM data slot for different rows within the frame. This means that the switch does not care about what the current row number is (within a frame). The only time row numbering matters is when interpreting the contents of the Link Overhead slots.

With a finest granularity of one slot per row, the switch elements can switch TDM traffic with a minimum of 2.52 Mbps of switching bandwidth. Since a slot can carry the equivalent of four columns of traffic from a SONET SPE, it can be said that the switch elements switch TDM traffic with a granularity of a VT1.5 or VT2 channel. Although a VT1.5 channel only occupies three columns in the SONET SPE, it will still be mapped to the slot format which is capable of holding four SPE columns. As mentioned above, the format of the contents of the thirty-six-bit slot carrying TDM traffic is a four-bit tag and a thirty-two bits of payload. The tag field definitions are shown in Table 1 below.

TABLE 1

| | |
|---|---|
| 0000 | Idle |
| 0001 | reserved |
| 1010 | reserved |
| 1011 | Data present |
| 1100 | V5 byte in bits 31–24 |
| 1101 | V5 byte in bits 23–16 |
| 1110 | V5 byte in bits 15–8 |
| 1111 | V5 byte in bits 7–0 |

The switch elements know whether or not a slot contains TDM data via preconfigured connection tables. These tables are implemented as an Input Cross Connect RAM for each input link. The input slot number is the address into the RAM, while the data output of the RAM contains the destination output link and slot number. The connection table can be changed by a centralized system controller which can send control messages to the switch elements via either of two paths: (1) a host interface port or (2) in-band control messages which are sent via the link data channel. Since TDM connections will be changed infrequently, this relatively slow control message approach to update the connection tables is acceptable. It is the responsibility of an external software module to determine and configure the connection tables within the switch elements such that no TDM data will be lost.

Returning now to FIG. 1, the receive side SONET interface of the port processor 10 includes the deserializer 12 and framer 14. This interface may be configured as one OC-48, 16-bits wide at 155 MHz, four OC-12s, serially at 622 MHz, or four OC-3s, serially at 155 MHz. When configured as one OC-48, the deserializer 12 is not used. When configured as four OC-12s or one OC-48, the deserializer 12 converts the serial data stream to a sixteen-bit wide parallel stream. The deserializer 12 includes circuitry to divide the input serial clocks by sixteen. The inputs to the deserializer include a one-bit serial data input, a one-bit 622 MHz clock and a one-bit 155 MHz clock. The outputs include a sixteen-bit parallel data output, a one-bit 38.87 MHz clock and a 9.72 MHz clock. The SONET interfaces are described in more detail in sections 3.2 and 3.3 of Appendix A.

Parallel data is sent to the SONET framer and transport overhead (TOH) block 14. All incoming signals are framed according to the BELLCORE GR-253 standard which is incorporated herein by reference. The byte boundary and the frame boundary are found by scanning a series of sixteen bit words for the F628 pattern. The framer frames on the pattern F6F6F6282828. Independent SONET SPEs within the STS-N frame are demultiplexed by the framer 14. There is a maximum of four independent line interfaces, therefore the framer 14 includes four independent framers. The inputs to the framer include a sixteen-bit parallel data input, and a one-bit clock which will accept 155 MHz, 38.87 MHz, or 9.72 MHz. The outputs of the framer include a sixteen-bit parallel data output, a one-bit start of frame (SOF) indication, a six-bit SPE ID used to indicate SONET SPE number. The SPEs are numbered 1 through 48 with respect to the line side port configuration.

The block 14 also terminates the transport (section and line) overhead for each independent SONET SPE. Since there are a maximum of forty-eight OC-1s on the line side, forty-eight transport overhead blocks are provided unless blocks are time-shared. The inputs to the TOH termination are the same as those discussed above with respect to the framer. The six-bit SPE ID enables data into this block. There is no need for an output data bus as the traffic is routed to this block and to the next block (Ptr Proc 16) on the same data bus. The data path only flows into this block, not through it.

The pointer processor 16 uses the SONET pointer (H1, H2 and H3 bytes in the TOH) to correctly locate the start of the payload data being carried in the SONET envelope. The SONET pointer identifies the location of byte #1 of the path overhead. The pointer processor 16 is responsible for accommodating pointer justifications that were inserted in order to justify the frequency difference between the payload data and the SONET envelope. Since there are a maximum of forty-eight OC-1s, forty-eight pointer processor blocks are mated to the forty-eight transport overhead termination blocks unless blocks are time-shared. The inputs to the pointer processor 16 are the same as those to the framer and TOH terminator 14. The outputs include a sixteen-bit parallel data output, a one-bit start of SPE indicator which coincides with word 1 of SPE 3, a one-bit SPE valid indicator which gaps out overhead and accommodates pointer movements, and a one-bit POH valid indicator which indicates when a path overhead byte is on the output bus.

The POH processor 18 processes the nine bytes of Path Overhead in each of the forty-eight SONET SPEs. Since there are a maximum of forty-eight SPEs, forty-eight path overhead processors are provided unless processors are time-shared. The inputs to the path overhead processor 18 include an eight-bit parallel data input, a four-bit SPE ID, the one-bit start of SPE indicator, and the one-bit POH valid indicator. The outputs include a one-bit V1 indicator, J1 info, alarms, and path status. Further details about blocks 14, 16, and 18 are provided by the GR-253 standard and documentation accompanying standard SONET mapper/demappers such as those available from Lucent or TranSwitch.

Once the frame boundaries of the incoming SONET/SDH signals are found and the location of the SPEs has been identified either through pointer processing or through Telecom bus I/F control signals, and the Path Overhead is processed, the payload is extracted from the SPE. The SPEs may be carrying TDM traffic, ATM cells or IP packets. The type of traffic for each SPE is configured through the microprocessor interface 78. Each SPE can carry only one type of traffic. The data from each SPE is routed directly to the correct payload extractor.

SPEs containing packets and ATM cells are sent to the HDLC framer 20 and the cell delineation block 22, respectively. Each SPE can be configured to carry packet data (packet over SONET). The Port Processor 10 supports packet over SONET for the following SONET (SDH) signals: STS-1 (VC-3), STS-3c (VC-4), STS-12c (VC-4-4c), and STS-48c (VC-4-16c). The datagrams are encapsulated in PPP packets which are framed using the HDLC protocol. The HDLC frames are mapped byte-wise into SONET SPEs and high order SDH VCs. The HDLC framer 20 performs HDLC framing and forwards the PPP packet to a FIFO buffer 24 where it awaits assembly into PDUs. The framer 20 has an input which includes a sixteen-bit parallel data input, a six-bit SPE ID, a one-bit SPE valid indicator, and a one-bit PYLD valid indicator. The output of the framer 20 includes a sixteen-bit data bus, a one-bit start of packet indicator, and a one-bit end of packet indicator. Further details about packet extraction from SONET are found in IETF (Internet Engineering Task Force) RFC 1619 (1999) which is incorporated herein by reference.

The cell delineation block 22 is based on ITU-T G.804, "ATM Cell Mapping into Plesiochronous Digital Hierarch (PDH)", 1998, the complete disclosure of which is hereby incorporated herein by reference. The cell delineation block 22 has inputs which include a sixteen-bit parallel data bus, a six-bit SPE ID, a one-bit SPE valid indicator, and a one-bit POH valid indicator. The outputs include a sixteen-bit parallel data bus and a one-bit start of cell indicator. Cells are placed in a FIFO 24 while awaiting assembly into PDUs. Further details regarding ATM extraction from SONET are found in ITU-T G.804.

The TDM data is routed to a TDM demultiplexer and low order pointer processor block 26 where the low order VTs and VCs are identified. If a particular SPE is configured for TDM data, then the TDM mapping is described using the host interface 78. Each SPE can carry a combination of VC-11, VC-12, VC-2, VC-3 & VC-4. There are seven VT groups in a single STS-1 payload, each VT group has twelve columns. Within one VT Group all of the VTs must be the same. Different VT groups within the same STS-1 SPE can carry different VT types, but within the group it is required that all VTs be of the same type. The VCs and VTs are demultiplexed out of the SONET signal based on the configuration for each of the SPEs. There is no interpretation of the traffic required to locate the containers and tributaries as all of this information is found in the configuration table (not shown) which is configured via the host interface 78. Frames are located inside of the VCs and the VTs through the H4 byte in the path overhead of the SPE. Pointer processing is performed as indicated by the V bytes in the VT superframe. The TDM demultiplexer and low order pointer processor block 26 has inputs which include sixteen bits of parallel data, a six-bits SPE ID, a one-bit start of SPE indicator, a one-bit SPE valid indicator, a one-bit V1 indicator, and one-bit POH valid indicator. The TDM demultiplexer and low order pointer processor block 26 provides the following outputs to the switch mapper 52: sixteen bits of parallel data, a one-bit VT/VC valid indicator, a six-bit SPE ID, and a five-bit VT/VC Number (0–27). The TDM data is placed in reserved slots in the frame as mentioned above and described in more detail below with reference to the switch mapper 52. Further details regarding TDM extraction are found in the GR-253 specification IP packets and ATM cells from the UTOPIA interface 44 are placed in FIFO 46. Packets and cells from the FIFOs 24 are merged with the packets and cells from the FIFO 46. The descriptor constructor 64 determines whether the data is an ATM cell or an IP packet and generates a corresponding interrupt to trigger the IPF/ATM look-up processor 66 to perform either IP routing look-up or ATM look-up. IP routing look-up is performed by searching for the IP destination address for every packet and the IP source address for packets that need classification. ATM look-up is performed by searching the VPI/VCI fields of the cells. Outputs of the IPF/ATM look-up processor 66 for both IP packets and ATM cells include a seventeen-bit flow index, a five-bit QOS index, and an indicator showing whether the IP packet needs classification. If the IP packet needs classification, the packet is passed to the IP classification processor 68 for classification; otherwise it is passed to the next stage of packet processing, the RED/policing processor 70. IP classification is described in detail in section 6.4 of Appendix A. The RED/Policing processor 70 performs random early detection and weighted random early detection for IP congestion control, performs leaky bucket policing for ATM traffic control, and performs early packet and partial packet discard for controlling ATM traffic which contains packets. The RED/Policing traffic control is described in detail in sections 7.5 et seq. of Appendix A. The presently preferred embodiment of the port processor 10 includes a mode register (not shown) which can be placed in a bypass mode to globally turn off the IP/ATM forwarding. In bypass mode, an external device is used for IP/ATM forwarding, and the data descriptors generated by the descriptor constructor 64 are routed directly to an output FIFO (not shown).

All of the data stored in the FIFOs 24 and 46 is in fifty-two-byte "chunks". If an IP packet is longer than fifty-two-bytes, it is segmented into multiple fifty-two-byte chunks. The input data descriptor for each chunk includes indications of whether the chunk is an ATM cell or a packet, whether it is the start of a packet or the end of a packet, packet length, and the source and destination port numbers. After processing by the IPF/ATM lookup processor 66 and the IP classification processor 68, an output data descriptor is written to a FIFO (not shown) which is read by the RED/Policing processor 70.

Cells and packets which survive RED/policing are read by the receive data link manager 72 which creates the PDUs described above with reference to FIG. 3a. The receive data link manager is described in detail in section 8 of Appendix A. According to the presently preferred embodiment, processed cells and packets are stored in an external FIFO which is read whenever it is not empty.

As shown in FIG. 1, the switch mapper 52 receives TDM traffic from the TDM demultiplexer and low order pointer processor 26 as well as PDUs from the data link manager 72. As mentioned above, the switch mapper also receives request elements. The request elements are formed by the arbiter 56 as described in more detail below. It is the function of the switch mapper (also referred to as the data mapper in Appendix A) to arrange TDM data, PDUs, and request elements in the frame described above with reference to FIGS. 3 and 3a–c.

The switch mapper 52 includes a state machine (not shown) which is associated with the ATM/IP PDUs. The data link manager 72 writes the PDU's using a sixty-four-bit interface to the external FIFO (not shown). The data is transmitted from the external FIFO to the switch mapper 52 in thirty-two-bit slots with four bits of parity. The state machine associated with the external PDU FIFO monitors the status of the FIFO and maintains data integrity.

In section 9 of Appendix A, the data link manager 72, arbiter block 56, switch mapper 52, and weighted round robin scheduler 80, together with memory and other support circuits (not shown in FIG. 1) are referred to collectively as the "receive switch controller". As described in detail above, each incoming ATM cell and packet is processed by performing a lookup based on the ATM VPI/VCI or on the IP source and destination. This lookup first verifies that the connection is active, and if active, it returns a seventeen-bit index. For ATM cells, the index points to a set of per VC parameters and to routing information. For packets, the index points to a set of queuing parameters and to routing information. The seventeen-bit index supports a maximum of 128K simultaneous IP and ATM flows through the port processor. The ATM cells are encapsulated in a cell container and stored in one of 128K queues in external memory. These 128K queues are managed by the data link manager 72. As mentioned above, the IP packets are fragmented into fifty-two-byte blocks and each of these blocks is encapsulated in a cell container (PDU). These cell containers are also stored in one of the 128K queues in external memory by the data link manager. The 128K IP/ATM flows are aggregated into one of thirty-two QOS queues for scheduling through the switch. The data link manager 72 also aggregates all the control headers required for transmission of cells through the switch into the QOS queues and inserts these routing tags into one of thirty-one QOS routing tag FIFOS. One of the queues, is reserved for high priority traffic. Any cells arriving in the high priority queue will interrupt the scheduler 80 and will be scheduled to leave the high priority queue immediately.

The scheduler 80 is responsible for scheduling cell containers through the switch. The scheduling algorithm used is weighted round robin which operates on the QOS queues. Once cells have been scheduled from these queues, the control headers from these queues are forwarded to the arbiter 56 and are stored in a request control table (not shown). The request arbiter 56 forms request elements from the control headers and forwards these requests to the switch data mapper 52 for transmission through the switch. The grants received in response to these requests are deserialized by block 58, deframed and transferred back to the arbiter block 56 by the grant block 62. For granted requests, the cell containers are dequeued from external memory by the data link manager 72 and transferred to the switch mapper 52 for transmission through the switch.

As mentioned above, the port processor 10 supports redundancy in order to improve reliability. Two redundancy schemes are supported. In the first redundancy scheme, the switch controller supports redundant routing tags and transparent route switch-over. In the second redundancy scheme, the port processor supports redundant data channels in both input and output directions. The redundant data channels connect to two separate switch fabrics. In the Appendices they are referred to as the A and B data channels. Each control header contains two routing tags, and each routing tag has a corresponding AB channel tag. This provides for two routes through the switch for data transmission. If both routing tags have the same channel tag, this allows for two alternate paths through the same switch fabric. If both routing tags have different channel tags, this allows for a redundant switch fabric and any route failing in one switch fabric will cause a switch-over to use the redundant switch fabric. An AB channel tag is used to indicate whether the data is to be routed using the A data channel or the B data channel. If, after a programmable number of consecutive tries, no grant is received in response to request elements using the A channel routing tag, a bit is set to switch over to the B channel routing tag. Further details of the redundancy feature are provided in sections 10.2.3 and 9.2.3 of Appendix A.

As mentioned above, the arbiter 56 is responsible for sending requests to the switch mapper 52 and processing the grants that arrive from the grant demapper 62. The arbiter dequeues requests from a routing tag FIFO, copies this information into a request control table, writes the FLOWID into FLOWID RAM, resets a request trial counter that counts the number of times a request has been tried, and resets the grant bit. Each request message has a unique request ID which is returned in the grant message. The request ID is the index in the arbiter request control table into which the routing tag is copied. The routing tag along with the request ID is forwarded to a routing tag formatter block which formats the routing tag into a request message and inserts the request into a request FIFO in the switch mapper 52.

The grant demapper in the grant block 62 stores the request ID and the grant in a FIFO called the grant_reqid FIFO. In the arbiter block 56, the request IDs are dequeued from A and B grant_reqid FIFOS alternatively depending on whether the switchover bit is set. The request IDs dequeued from the FIFO are used to set a grant bit in the grant register at the bit position indicated by the request ID, to index the FLOWID RAM, and read the FLOWID associated with the request ID. This FLOWID is written into a deq-flowid FIFO for the appropriate channel, i.e. if the request ID is dequeued from the A reqid_fifo, the FLOWID is written into the A deqflowid_fifo. The data link manager 72 monitors the deqflowid_fifo and uses the FLOWID to dequeue data PDUs from external memory and send them to the switch mapper 52 for transmission in the next row time.

An end_of_grants signal is asserted by the grant demapper 62, when no more grants can be received at the grant demapper. In most switch implementations the end_of_grants signal is rarely, if ever, asserted. It is only in switches having many stages that the end_of_grants signal is more likely to be asserted. Once the end_of_grant signal has been received the arbiter 56 begins the process of updating the request control table. If a grant has not been returned for a routing tag stored in the request control table, the request trial counter is incremented and a new request is generated using the routing tag. If a routing tag in the request control table has been sent as a RE a (programmed) maximum number of times, the most significant fifteen bits of the FLOWID are used to index into the redundancy control table and update the bit to indicate failure of the current path and to select the alternate routing path. Further details regarding the arbiter block 56 are provided at section 9.2.4 of Appendix A.

As described above, the TDM data, ATM/IP PDU's and the request messages are combined into a single data stream for transmission through the switch fabric. This combination is performed by the switch mapper 52 on the receive side of the port processor. On the transmit side of the port processor, a switch demapper 60 separates TDM data from ATM/IP PDUs. According to the presently preferred embodiment, the demapper 60 is provided with external memory for a PDU FIFO. For ATM/IP data, the demapper writes PDUs to the FIFO and interrupts the data link manager 74. The data link manager 74 reads the header information from the PDU FIFO, and extracts the FLOWID. Based on the FLOWID, the datalink manager 74 retrieves a Linked List/Shaping/ Scheduling data structure from external memory. The data link manager 74 writes the linked list pointers to the PDU FIFO, then initiates a DMA transfer to move the PDU to external memory. The data link manager updates the head, tail, and count fields in the Linked List/Shaping/Scheduling data structure and passes the data structure to the Shaping/ Scheduling processor 76 through a Shaping/Scheduling FIFO. The Shaping/Scheduling processor 76 performs the Shaping and Scheduling functions and updates the Linked List/Shaping/Scheduling datastructure.

The data flow from external memory to the SONET/ UTOPIA Data FIFOs 30 and 48 is as follows. The data link manager 74 polls the PDU FIFO and SONET/UTOPIA FIFO status flags. If the PDU FIFO is not empty and the SONET/UTOPIA FIFO is not full for a particular output port, the data link manager 74 retrieves the Link List/ Shaping/Scheduling data structure for the Flow ID read from the PDU FIFO. (Note that for an IP packet flow, the data link manager will continue to retrieve PDUs from the Linked List until a PDU with an End of Packet indicator is found.) The data link manager then initiates a DMA transfer from external memory to the SONET/UTOPIA FIFOs 30, 48. The data link manager 74 then updates the Link List/Shaping/ Scheduling data structure and writes it back to external memory.

On the transmit side of the port processor 10, the grant framer, deframer, serializer and deserializer in the grant block 62, the switch demapper 60, the transmit datalink manager 74, and the transmit scheduler and shaper 76 are referred to collectively as the transmit (TX) switch controller in Appendix A. The TX switch controller is responsible for either accepting or rejecting requests that come into the port processor for output transmission. To do this, the TX switch controller checks if the queue identified by the output port number of the request can accept a cell container. These one hundred twenty-eight queues are managed by the TX data link manager 74. According to the presently preferred embodiment, these queues are stored in external memory. The scheduling of these cell containers is performed by the TX scheduler 76. If the queue can accept the cell container, the request is turned into a grant and inserted into a grant_fifo. The grant-framer and serializer 62 reads this information and creates an grant message for transmission through the grant path.

The TX switch controller monitors the status of the data queues for each of the one hundred twenty-eight output ports using the following three rules. If the full_status bit for the requested output port is set, there is no buffer space in the queue for any data PDUs destined for that output port and all requests to that output port are denied. If the full_status bit is not set and the nearly_full_status bit is set, there is some space in the queue for data PDUs destined for that output port; however this space may be reserved for higher priority traffic. In this instance the QOS number is checked against a threshold (programmed) QOS number and if the QOS number is less than the threshold, the request will be accepted. If the nearly full_status bit is not set, all incoming requests are granted. If a request is accepted, the corresponding output port counter is incremented. This reserves space in the data buffer (30 or 48) for the arrival of the data PDU at that output port. The transmit data link manager 74 constantly monitors the one hundred twenty-eight output port counters and sets/resets the one hundred twenty-eight full and nearly full status bits.

The port processor 10 creates complete outgoing SONET signals. All of the transport and path overhead functions are supported. The SONET interfaces can run in source timing mode or loop timing mode.

The high order pointer is adjusted by the high order pointer generator 38 through positive and negative pointer justifications to accommodate timing differences in the clocks used to generate the SONET frames and the clock used to generate the SONET SPEs. At initialization, SPE FIFOs are allowed to fill to halfway before data is taken out. The variations around the center point are monitored to determine if the rate of the SONET envelope is greater than or less than the rate of the SPE. If the rate of the SONET envelope is greater than the rate of the SPE, then the SPE FIFO will gradually approach a more empty state. In this case, positive pointer movements will be issued in order to give the SPE an opportunity to send additional data. If the rate of the SONET envelope is less than the rate of the SPE, then the SPE FIFO will gradually approach a more full state. In this case, negative pointer movements will be issued in order to give the SPE an opportunity to output an extra byte of data from the FIFO. The SONET framer and TOH generator 40 generate transport overhead according to the BELLCORE GR-253 standard.

The outgoing SONET frames are generated from either the timing recovered from the receive side SONET interface or from the source timing of the Port Processor. Each signal is configured separately and they can be configured differently. The frame orientation of the outgoing SONET frames is arbitrary. Each of the four signals can be running off different timing so there is no need to try to synchronize them together as they will constantly drift apart. There is no need to frame align the Tx ports to the Rx ports as this would result in realigning the Tx port after every realignment of the Rx port.

For OC-3 and OC-12 the 16-bit wide internal bus is serialized to 155 Mbps or 622 Mbps by the serializer 42. For OC-48 applications, the entire sixteen bit bus is output under the control of an external serializer (not shown).

There is a potential for forty-eight different SPEs being generated for the outgoing SONET interfaces. All of these SPEs are generated from a single timing reference. This allows all of the SPE generators to be shared among all of the SONET and Telecom bus interfaces without multiplexing between the different clocks of the different SONET timing domains. The SPE consists of the Path level overhead and the payload data. The payload data can be TDM, ATM or packet. All of these traffic types are mapped into single SPEs or concatenated SPEs as required by their respective standards. As the SPEs are generated, they are deposited into SPE FIFOs. For each SPE there is a sixty-four-byte FIFO and these individual SPE FIFOs are concatenated through SPE concatenation configuration registers. As described above, the fill status of the SPE FIFOs is used to determine the correct time to perform a positive or negative pointer justification.

TDM, ATM and packet data are all mapped into SONET SPEs as specified by their respective standards. The type of data carried in each of the potential forty-eight SPEs is configured through the external host processor. Based on this configuration, each SPE generator is allocated the correct type of mapper. All of this configuration is performed at initialization and can only be changed when the particular SPE is first disabled. Once the configuration is complete, there is an isolated set of functional blocks allocated to each SPE. This set of functional blocks includes one of each of the following: payload mapper, payload FIFO, POH generator, SPE FIFO and SPE generator. Each of the ATM and packet payload mappers has a payload FIFO into which it writes payload data for a particular SPE. For TDM traffic, each potential Virtual Container is allocated its own FIFO.

Returning now to FIG. 2, in each "datapath and link bandwidth arbitration module" 102, the data stream deserializer 126 synchronizes to the incoming serial data stream and then reassembles the row stream which is transported using two physical unilink channels. It also provides FIFO buffering on each of the two incoming serial streams so that the streams may be "deskewed" prior to row reassembly. It recovers the thirty-six-bit slot data from the row stream in a third FIFO which is used for deskewing the twelve input links. This deskewing allows all the input links to forward slot N to the switching core simultaneously. The link deskewing is controlled by the link synchronization and timing control module 150. The deserializer 126 also continuously monitors the delta between where slot 0 of the incoming row is versus the internal row boundary signal within the switch element. The difference is reported to the Link RISC Processor 156 and is used (in the first stage of a switch) as part of the ranging process to synchronize the port processor connected to the input link.

The data stream demapper 128 is responsible for extracting the data from the incoming serial data links. It demaps the input link slots based on the input slot number and determines whether the traffic is TDM, PDU, or a request element (RE). For TDM traffic, the demapper determines the destination link and row buffer 132 memory address. This information is stored in a demapper RAM (not shown) which is configured by software when TDM connections are added or torn down. For PDU traffic, the demapper 128 assembles all sixteen slots which make up the PDU into a single 64-byte PDU word, then forwards this entire PDU word to the row buffer mapper logic 130. The PDUs are assembled prior to forwarding them to the row buffer 132 so that the row buffer mapper 130 can write the entire PDU to the row buffer 132 in a single clock cycle. This provides the maximum possible write-side memory bandwidth to the row buffer 132. It is a significant feature of the switch element that twelve entire PDUs are written to a single row buffer in six link slot times (twelve core clock cycles). For request elements, the demapper 128 assembles the three-slot block of REs into two forty-eight-bit REs and forwards them to the request parser module 152. A detailed description of the data stream demapper 128 is provided in Sections 4.3.1 et seq. of Appendix B.

The row buffer mapper 130 is responsible for mapping traffic which is received from the data stream demapper 128 into the row buffer 132. The mapper 130 provides FIFO buffers for the TDM traffic as it is received from the data stream demapper 128, then writes it to the row buffer 132. The row buffer memory address is actually preconfigured in the demapper RAM (not shown) within the data stream demapper module 128. That module forwards the address to the row buffer mapper 130 along with the TDM slot data. The mapper 130 also writes PDU traffic from the data stream demapper 128 to the row buffer 132 and computes the address within the row buffer 132 where each PDU will be written. PDUs are written into the row buffers starting at address 0 and then every sixteen-slot address boundary thereafter, up to the maximum configured number of PDU addresses for the row buffer 132. A detailed description of the row buffer mapper 130 is provided in Section 4.3.1.4 of Appendix B.

The row buffer 132 contains the row buffer memory elements. According to the presently preferred embodiment, it provides double buffered row storage which allows one row buffer to be written during row N while the row data which was written during row N−1 is being read out by the data stream mapper 136. Each row buffer is capable of storing 1536 slots of data. This allows the row buffer to store ninety-six PDUs or 1536 TDM slots or a combination of the two traffic types. Request elements and link overhead slots are NOT sent to the row buffer 132. Therefore the row buffer does not need to be sized to accommodate the entire 1700 input link slots. According to the presently preferred embodiment, the row buffer write port is 16*36=576 bits wide and it supports writing of only one thirty-six-bit slot (TDM data) or writing of an entire 576-bit word (PDU data) in a single clock cycle. A detailed description of the row buffer 132 is provided in Section 4.3.1.4 of Appendix B.

Request arbitration utilizes two components: a centralized request parser module 152 and a request arbitration module 134 for each of the output links. Request elements are extracted from the input slot stream by the data stream demapper 128 and are forwarded to the request parser 152. The request parser 152 forwards the forty-eight-bit request elements to the appropriate request arbitration module 134 via two request buses (part of the input link bus 120). Each request bus may contain a new request element each core clock cycle. This timing allows the request arbitration logic to process thirteen request sources in less than eight core clock cycles. The thirteen request sources are the twelve input data streams and the internal multicast and in-band control messaging module 156. The request arbitration module 134 monitors the two request element buses and reads in all request elements which are targeted for output links the request arbitration module is implementing. According to the presently preferred embodiment, the request arbitration module 134 provides buffering for up to twenty-four request elements. When a new request element is received, it is stored in a free RE buffer (not shown). If there are not any free RE buffers, then the lowest priority RE which is already stored in a buffer is replaced with the new RE if the new RE is a higher priority. If the new RE is equal to or lower in priority than all REs currently stored in the RE buffers then the new RE is discarded. On the output side, when the data stream mapper module 138 is ready to receive the next RE, the request arbitration module 134 forwards the highest priority RE which is stored in the RE buffers to the data stream mapper module 136. If the RE buffers are empty, then an "Idle" RE is forwarded. A detailed description of the request arbitration module 134 is provided in Section 7 of Appendix B.

The data stream mapper 136 is responsible for inserting data and request elements into the outgoing serial data links. This includes mapping of the output link slots based on the output slot number to determine if the traffic is TDM, PDU, request element, or test traffic. The determination is based on the contents of the mapper RAM (not shown). For TDM traffic, the row buffer memory address is determined from the mapper RAM which is configured by software as TDM connections are added or torn down. For PDU traffic, the data stream mapper 136 reads one slot at a time from the row buffer 132. The row buffer memory address is stored in the mapper RAM by software. If the target PDU is not valid (i.e., a PDU was not written to that row buffer location during the previous row time), then the mapper 136 transmits an idle pattern in order to ensure that a data PDU is not duplicated within the switch. For request elements, the mapper assembles the three-slot block of REs from two forty-eight-bit REs. The REs are read from the request arbitration module 134. For test patterns, the mapper 136 inserts the appropriate test pattern from the output link bus 122. These test patterns are created by either the test pattern generator 162 or test interface bus 164 modules.

The data stream mapper supports slot multicasting at the output stage. For example, the data stream mapper for any output link is able to copy whatever any other output link is sending out on the current slot time. This copying is controlled via the mapper RAM and allows the mapper to copy the output data from another output link on a slot-by-slot basis. A detailed description of the data stream mapper 136 is provided in Section 4 of Appendix B.

The data stream serializer 138 creates the output link serial stream. Data slots are received via the data stream mapper module 136 and the link overhead is generated internally by the data stream serializer 138. The serializer 138 also splits the row data stream into two streams for transmission on the two paths 110, 114. A detailed description of this module is provided in Section 11 of Appendix B.

The grant stream deserializer 140 in each module 102 works in much the same manner as the data stream deserializer 126. The primary difference is that the grant data only utilizes a single path, thus eliminating the need for deskewing and deinterleaving to recover a single input serial stream. Since this serial link is only one half the data stream rate of the forward link, there are 850 slots per row time. A single FIFO (not shown) is used to allow for deskewing of the input serial grant streams for all 12-links. A detailed description of the grant stream deserializer 140 is provided in Section 11 of Appendix B.

The grant stream demapper 142 is responsible for extracting the data from the incoming serial grant links. This includes demapping of the received grant link slots based on the input slot number to determine if the traffic is a grant element or another kind of traffic. The determination is based on the contents of the grant demapper RAM (not shown). According to the presently preferred embodiment, traffic other than grant elements is not yet defined. For grant elements, the grant stream demapper 142 assembles the three-slot block of GEs into two forty-eight-bit GEs and forwards them to the single grant parser module 154. A detailed description of the grant stream demapper 142 is provided in Section 7.2.3.2 of Appendix B.

The grant arbitration module 144 operates in an identical manner to the request arbitration logic 134. In the presently preferred embodiment, this module is identical to the request arbitration module. The only difference is that it processes grant elements in the reverse path instead of request elements in the forward path. It will be recalled that grant elements are, in fact, the request elements which have been returned.

The grant stream mapper 146 is responsible for inserting data into the outgoing serial grant links. It maps the output grant slots based on the output slot number to determine if the traffic is a grant element or test traffic. The determination is based on the contents of the grant mapper RAM (not shown). For grant elements, it assembles the three-slot block of GEs from two forty-eight-bit GEs. The GEs are read from the grant arbitration module 144. For test patterns, it inserts the appropriate test pattern from the output link bus 122. These test patterns are created by either the test pattern generator 162 or the test interface bus 164 modules. A detailed description of the grant stream mapper 146 is provided in Section 7.2.3.2.

The grant stream serializer 148 works in much the same manner as the data stream serializer 138. The primary difference is that the grant data only utilizes a single path, thus eliminating the need for interleaving the transmit serial stream across multiple output serial streams. Since this serial link is only one half the forward data stream rate, there are only 850 slots per row time. A detailed description of the grant stream serializer 148 is provided in Section 11 of Appendix B.

The modules described above (except for the request parser and the grant parser) are instantiated for each link module 102 of which there are twelve for each switch element 100. The following modules are instantiated only once for each switch element.

The link synchronization & timing control 150 provides the global synchronization and timing signals used in the switch element. It generates transmission control signals so that all serial outputs start sending row data synchronized to the RSYNC (row synchronization) input reference. It also controls the deskewing FIFOs in the data stream deserializers so that all twelve input links will drive the data for slot N at the same time onto the input link bus 120. This same deskewing mechanism is implemented on the grant stream deserializers. A detailed description of the link synchronization and timing control 150 is provided in Section 10 of Appendix B.

The request parser 152 receives inputs from all thirteen request element sources and forwards the REs to the appropriate request arbitration modules via the two request element buses. A detailed description of the request parser 152 is provided in Section 7.2.1.1 of Appendix B.

The grant parser 154 physically operates in an identical manner to and is identical to the request parser 152. The only difference is that it processes grant elements in the reverse path instead of request elements in the forward path. As mentioned above, the grant elements contain the same information as the request elements, i.e. the link address through the switch from one port processor to another.

The link RISC processor 156 controls the ranging synchronization on the input links with the source port processors in the first stage of the switch fabric. It also controls the ranging synchronization on the output link grant stream input with the source port processors in the last stage of the switch fabric. It also handles the Req/Grant processing needed to transmit multicast messages and controls the reception and transmission of the in-band communications PDUs. All in-band communications PDUs are forwarded to the Configuration RISC Processor 158 which interprets the messages. The link RISC processor 156 only handles the Req/Grant processing needed to transmit multicast and in-band communications messages.

The configuration RISC controller 158 processes configuration and status messages received from an external controller module (not shown) and in-band communication messages as described above. The system control module 160 handles all the reset inputs and resets the appropriate internal modules. The configuration RISC controller 158 and the system control module 160 are preferably implemented with an Xtensa™ processor from Tensilica, Inc., Santa Clara, Calif.

The test pattern generator and analyzer 162 is used for the generation of various test patterns which can be sent out on any slot on the data stream or grant stream outputs. It is also capable of monitoring input slots from either the received data stream or grant stream.

The test interface bus multiplexer 164 allows for sourcing transmit data from the external I/O pins and forwarding data to the I/O pins. This is used for testing the switch element when a port processor is not available.

The unilink PLL 166 is used to create the IF clock needed by the unilink macros. Within each unilink macro another PLL multiplies the IF clock up to the serial clock rate. The core PLL 168 is used to create the clock used by the switch element core logic. In the presently preferred embodiment, the core clock is approximately 250 MHz. A detailed description of both PLLs is provided in Section 9 of Appendix B.

The JTAG interface 170 is used for two purposes: (1) boundary scan testing of the switch element at the ASIC fab and (2) Debug interface for the Configuration RISC Processor.

As shown in FIG. 2, there are three datapath buses (the input link bus 120, the output link bus 122, and the grant bus 124) which are used to move switched traffic from the input links to the output links. These buses are also used to carry traffic which is sourced or terminated internally within the switch element. The significant datapaths of the input link bus are summarized in Table 2 below. The significant datapaths of the output link bus are summarized in Table 3 below. The significant datapaths of the grant bus are summarized in Table 4 below.

TABLE 2

| Name | Qty | Width | Description | Source |
|---|---|---|---|---|
| islot_num | 1 | 11 | Current input slot number for traffic from the Data Stream Deserializers | Link Sync & Timing Ctrl |
| ilink_req_0 thru ilink_req_11 | 12 | 48 | Request elements received on the input link | Data Stream Demapper module for each input link |
| lcl_req_0 | 1 | 48 | Request elements generated locally | Link RISC Controller |
| req_a, req_b | 2 | 48 | Parsed request elements | Request Parser |
| ilink_tdm_data_0 thru ilink_req_11 | 12 | 47 | TDM data, 36-bit data + 11 bit destination row buffer address | Data Stream Demapper module for each input link. |
| ilink_tdm_dlink_0 thru ilink_tdm_dlink_11 | 12 | 4 | Destination output link (i.e., row buffer) identifier | Data Stream Demapper module for each input link |
| ilink_pdu_0 thru ilink_pdu_11 | 12 | 512 | Complete 64-byte PDU which has been assembled from the incoming slots | Data Stream Demapper module for each input link |
| ilink_pdu_flag_0 thru ilink_pdu_flag_11 | 12 | 13 | Each flag is asserted for each destination which the current PDU is addressed. Total destinations = 12 output links plus the internal MC & In-band Comm Controller | Data Stream Demapper module for each input link |
| lcl_pdu | 1 | 64 | Bus used to transport locally generated PDUs to the Data Stream Demappers | Link RISC Controller |

TABLE 3

| Name | Qty | Width | Description | Source |
|---|---|---|---|---|
| oslot_num | 1 | 11 | Current output slot number for traffic destined for the output links. | Link Sync & Timing Ctrl |
| rbuf_dout_0 thru rbuf_dout_11 | 12 | 36 | Slot data output from the row buffer. | Row Buffer for each output link. |
| rbuf_rd_addr | 12 | 12 | Row buffer read address. | Data Stream Mapper for each output link. |
| test_src1, test_src2, test_src3 | 3 | 36 | Test traffic sources. | Test Pattern Generator, Test Interface Bus |
| idle_ptrn | 1 | 36 | Idle pattern which is transmitted when no valid PDU data is available. | Data Stream Demapper module for each input link. |

TABLE 3-continued

| Name | Qty | Width | Description | Source |
|---|---|---|---|---|
| olink_req_0 thru olink_req_11 | 12 | 48 | Request elements for each output link. | Req Arbitration modules. |
| omap_data_0 thru omap_data_11 | 12 | 36 | Link output after the mapping multiplexers. All 12 outputs are fed back into each of the Data Stream Mappers so that TDM multicasting can be done. | Data Stream Mapper for each output link |

TABLE 4

| Name | Qty | Width | Description | Source |
|---|---|---|---|---|
| olink_gntslot_num | 1 | 10 | Current input slot number for traffic from the Grant Stream Deserializers. | Link Sync & Timing Ctrl |
| olink_gnt_0 thru olink_gnt_11 | 12 | 48 | Grant elements received on the grant receiver which is associated with the output link. | Grant Stream Demapper. |
| olink_gntslot_0 thru olink_gndslot_11 | 12 | 36 | Demapped slots from the received grant stream. These are slots which are not carrying grant elements. | Grant Stream Demapper. |
| gnt_a, gnt_b | 2 | 48 | Parsed grant elements | Grant Parser |

According to the presently preferred embodiment, each switch element includes a multicast controller and a separate multicast PDU buffer. Multicast request elements flow through the switch in the same manner as standard unicast request elements. At the point where the message needs to be multicast, the hop-by-hop field's bit code for that switch stage indicates that the request is multicast. The request is forwarded to the multicast controller. On the grant path, the multicast controller sources a grant if there is room for the data in the multicast recirculating buffers. Once the data has been transmitted to the multicast buffer, the multicast controller examines the data header and determines which output links it needs to be sent out on. At this point, the multicast controller sources a number of request messages which are handled in the same manner as unicast requests.

There have been described and illustrated herein several embodiments of a network switch which supports tdm, atm, and ip traffic. While particular embodiments of the invention have been described, it is not intended that the invention be limited thereto, as it is intended that the invention be as broad in scope as the art will allow and that the specification be read likewise. For example, while the invention has been disclosed as sending requests in-band and sending grants out-of-band, it is within the scope of the claimed invention to send requests out-of-band if bandwidth is constrained. It will therefore be appreciated by those skilled in the art that yet other modifications could be made to the provided invention without deviating from its spirit and scope as so claimed.

The invention claimed is:

1. A method for arbitrating bandwidth in a communications switch, comprising:
   a) generating a repeating data frame having a plurality of rows;
   b) making requests during row N for space in row N+1; and
   c) granting the requests through an out-of-band link.

2. A method according to claim 1, wherein:
   each request includes through-the-switch routing information and priority level information.

3. A method according to claim 2, wherein said switch is a multistage switch, said method further comprising:
   d) buffering the request at each stage of the switch;
   e) discarding low priority requests when the buffer reaches a threshold.

4. A method according to claim 3, wherein:
   said step of granting requests includes returning requests which have not been discarded before reaching the egress of the switch.

5. A method according to claim 1, wherein:
   each request for space is for a 52-byte chunk of space.

6. A method according to claim 5, wherein bandwidth is arbitrated among ATM cells and variable length packets, said method further comprising:
   d) segmenting each packet larger than 52-bytes into a plurality of 52-byte chunks.

7. A method according to claim 6, wherein:
   each request includes through-the-switch routing information and priority level information.

8. A method according to claim 7, wherein said switch is a multistage switch, said method further comprising:
   e) buffering the request at each stage of the switch;
   f) discarding low priority requests when the buffer reaches a threshold.

9. A method according to claim 8, wherein:
   said step of granting requests includes returning requests which have not been discarded before reaching the egress of the switch.

10. A method according to claim 9, further comprising:
    g) discarding requests for all following segments of a packet when a request for one segment of the packet has been discarded.

11. A method according to claim 1, wherein:
    said requests are made in-band.

12. A method according to claim 1, wherein:
said requests are made out-of-band.

13. An apparatus for arbitrating bandwidth in a communications switch, comprising:
   a) means for generating a repeating data frame having a plurality of rows;
   b) means for making requests during row N for space in row N+1; and
   c) means for granting the requests through an out-of-band link.

14. An apparatus according to claim 13, wherein:
each request includes through-the-switch routing information and priority level information.

15. An apparatus according to claim 14, further comprising:
   d) means for buffering the request at each stage of the switch; and
   e) means for discarding low priority requests when the buffer reaches a threshold.

16. An apparatus according to claim 15, wherein:
said means for granting requests includes means for returning requests which have not been discarded before reaching the egress of the switch.

17. An apparatus according to claim 13, wherein:
each request for space is for a 52-byte chunk of space.

18. An apparatus according to claim 17, wherein bandwidth is arbitrated among ATM cells and variable length packets, said apparatus further comprising:
   d) means for segmenting each packet larger than 52-bytes into a plurality of 52-byte chunks.

19. An apparatus according to claim 18, wherein:
each request includes through-the-switch routing information and priority level information.

20. An apparatus according to claim 19, further comprising:
   e) means for buffering the request at each stage of the switch; and
   f) means for discarding low priority requests when the buffer reaches a threshold.

21. An apparatus according to claim 20, wherein:
said means for granting requests includes means for returning requests which have not been discarded before reaching the egress of the switch.

22. An apparatus according to claim 21, further comprising:
   g) means for discarding requests for all following segments of a packet when a request for one segment of the packet has been discarded.

23. An apparatus according to claim 13, wherein:
said requests are made in-band.

24. An apparatus according to claim 13, wherein:
said requests are made out-of-band.

* * * * *

UNITED STATES PATENT AND TRADEMARK OFFICE
CERTIFICATE OF CORRECTION

PATENT NO.         : 7,061,935 B1
APPLICATION NO.    : 09/717147
DATED              : June 13, 2006
INVENTOR(S)        : Subhash C. Roy et al.

Page 1 of 1

It is certified that error appears in the above-identified patent and that said Letters Patent is hereby corrected as shown below:

Title Page, Item 56, column 1, line 7, the reference to patent no. "5,909,429" is corrected to --5,909,427--

Signed and Sealed this

Twenty-fifth Day of March, 2008

JON W. DUDAS
*Director of the United States Patent and Trademark Office*